(12) United States Patent
Mao et al.

(10) Patent No.: US 12,432,795 B2
(45) Date of Patent: Sep. 30, 2025

(54) BLUETOOTH NETWORK ESTABLISHING SYSTEM AND METHOD

(71) Applicant: Realtek Semiconductor Corporation, Hsinchu (TW)

(72) Inventors: Weifeng Mao, Jiangsu Province (CN); Zhuwei Lu, Jiangsu Province (CN); Jidong Chen, Jiangsu Province (CN); Zuomin Li, Jiangsu Province (CN)

(73) Assignee: Realtek Semiconductor Corporation, Hsinchu (TW)

( * ) Notice: Subject to any disclaimer, the term of this patent is extended or adjusted under 35 U.S.C. 154(b) by 481 days.

(21) Appl. No.: 18/147,005

(22) Filed: Dec. 28, 2022

(65) Prior Publication Data

US 2024/0015804 A1    Jan. 11, 2024

(30) Foreign Application Priority Data

Jul. 7, 2022    (CN) .......................... 202210803682.4

(51) Int. Cl.
*H04W 76/10* (2018.01)
*H04W 8/00* (2009.01)

(52) U.S. Cl.
CPC ........... *H04W 76/10* (2018.02); *H04W 8/005* (2013.01)

(58) Field of Classification Search
CPC ................................ H04L 12/28; H04L 12/50
USPC .................................. 370/329.401, 402, 403
See application file for complete search history.

(56) References Cited

U.S. PATENT DOCUMENTS

| | | | |
|---|---|---|---|
| 6,937,158 B2 | 8/2005 | Lansford et al. | |
| 7,596,353 B2 | 9/2009 | Chung et al. | |
| 8,190,716 B2 | 5/2012 | Zhodzishsky et al. | |
| 10,051,450 B1 | 8/2018 | Malovany et al. | |
| 10,141,974 B2 | 11/2018 | Waxman | |
| 10,805,782 B1 | 10/2020 | VijayaRaghavan et al. | |
| 10,952,267 B2 * | 3/2021 | Song ..................... | H04W 8/005 |
| 11,799,750 B1 | 10/2023 | Prasad et al. | |

(Continued)

FOREIGN PATENT DOCUMENTS

| | | |
|---|---|---|
| CN | 103975612 A | 8/2014 |
| CN | 104244170 A | 12/2014 |
| CN | 114365580 A | 4/2022 |

OTHER PUBLICATIONS

"Bluetooth Core Specification" Bluetooth SIG, Inc., Jul. 13, 2021.

(Continued)

*Primary Examiner* — Dang T Ton

(74) *Attorney, Agent, or Firm* — CKC & Partners Co., LLC

(57) ABSTRACT

A Bluetooth network establishing system and method are provided. The system includes a plurality of node devices and a gateway device. The gateway device is used to connect a Bluetooth network to an external network. A first node device of the node devices broadcasts a first inquiry operation. In response to the first inquiry operation, the gateway device in a first inquiry scan state sends a first extended inquiry response and executes a first page scan state. The first node device executes a first page operation, wherein the first page operation determines whether to establish a first communication connection with the gateway device to join the Bluetooth network according to the first extended inquiry response. After the first node device joins the Bluetooth network, the first node device executes a second inquiry scan state.

20 Claims, 9 Drawing Sheets

(56) References Cited

U.S. PATENT DOCUMENTS

| | | |
|---|---|---|
| 2002/0103942 A1 | 8/2002 | Comeau |
| 2003/0046413 A1 | 3/2003 | Sakakura |
| 2004/0100924 A1 | 5/2004 | Yam |
| 2005/0083741 A1 | 4/2005 | Chang et al. |
| 2006/0025075 A1 | 2/2006 | Chung et al. |
| 2007/0238483 A1 | 10/2007 | Boireau et al. |
| 2009/0034498 A1 | 2/2009 | Banerjea et al. |
| 2010/0103850 A1 | 4/2010 | Gossain et al. |
| 2011/0053507 A1 | 3/2011 | Choi |
| 2012/0257508 A1 | 10/2012 | Reunamaki et al. |
| 2012/0258665 A1 | 10/2012 | Sip |
| 2014/0003409 A1 | 1/2014 | Van De Laar et al. |
| 2014/0351419 A1 | 11/2014 | Hunt et al. |
| 2016/0088424 A1 | 3/2016 | Polo et al. |
| 2016/0174022 A1 | 6/2016 | Nhu |
| 2016/0277522 A1 | 9/2016 | Singh et al. |
| 2017/0041868 A1 | 2/2017 | Palin et al. |
| 2018/0184235 A1 | 6/2018 | Wu |
| 2018/0206094 A1 | 7/2018 | Choi |
| 2018/0206187 A1 | 7/2018 | Zavolainen et al. |
| 2018/0368197 A1 | 12/2018 | Zeilingold et al. |
| 2019/0287063 A1 | 9/2019 | Skaaksrud et al. |
| 2023/0171028 A1 | 6/2023 | Zhang |

OTHER PUBLICATIONS

"Bluetooth Network Encapsulation Protocol (BNEP) Specification" Bluetooth SIG, Inc., Feb. 14, 2003.

"Dial-Up Networking Profile" Bluetooth SIG, Inc., Nov. 6, 2012.

Maciej Nikodem et al., "Experimental Evaluation of Advertisement-Based Bluetooth Low Energy Communication", Sensors, Dec. 23, 2019. https://www.researchgate.net/Publication/338127585_Experimental_Evaluation_of_Advertisement-Based_Bluetooth_Low_Energy_Communication.

* cited by examiner

BLUETOOTH NETWORK ESTABLISHING SYSTEM AND METHOD

CROSS-REFERENCE TO RELATED APPLICATION

This application claims priority to China Application Serial Number 202210803682.4, filed Jul. 7, 2022, which is herein incorporated by reference in its entirety.

BACKGROUND

Field of Invention

The present invention relates to a Bluetooth network establishing system and method. More particularly, the present invention relates to a Bluetooth network establishing system and method for a Basic Rate (BR)/Enhanced Data Rate (EDR) Bluetooth technology.

Description of Related Art

In the prior art, the Basic Rate/Enhanced Data Rate Bluetooth technology can support point-to-point connection services between Bluetooth devices. However, before the operation of point-to-point connection, the Bluetooth devices need to be manually paired with each other, and only two Bluetooth devices can communicate with each other. Therefore, the prior art cannot automatically form a Bluetooth network including a plurality of Bluetooth devices.

Accordingly, there is an urgent need for a technology that can automatically establish a Bluetooth network including a plurality of devices.

SUMMARY

An objective of the present disclosure is to provide a Bluetooth network establishing system. The Bluetooth network establishing system comprises a plurality of node devices and a gateway device. The gateway device is configured to connect a Bluetooth network to an external network. A first node device among the node devices broadcasts a first inquiry operation. In response to the first inquiry operation, the gateway device in a first inquiry scan state sends a first extended inquiry response and executes a first page scan state. The first node device executes a first page operation, wherein the first page operation determines whether to establish a first communication connection with the gateway device to join the Bluetooth network according to the first extended inquiry response. The first node device executes a second inquiry scan state after the first node device joins the Bluetooth network.

Another objective of the present disclosure is to provide a Bluetooth network establishing method, which is adapted for use in a Bluetooth network establishing system. The Bluetooth network establishing system comprises a plurality of node devices and a gateway device. The gateway device is configured to connect a Bluetooth network to an external network. The Bluetooth network establishing method comprises following steps: executing, by the gateway device, a first inquiry scan state; broadcasting, by a first node device among the node devices, a first inquiry operation; sending, by the gateway device in the first inquiry scan state, a first extended inquiry response and executing a first page scan state in response to the first inquiry operation; executing, by the first node device, a first page operation, wherein the first page operation determines whether to establish a first communication connection with the gateway device to join the Bluetooth network according to the first extended inquiry response; and executing, by the first node device, a second inquiry scan state after the first node device joins the Bluetooth network.

According to the above descriptions, the Bluetooth network establishing technology (at least including the system and method) provided by the present disclosure inquires whether there is an extended inquiry response sent by a gateway device or a relay device in the nearby area through the node device broadcasting the inquiry operation and the gateway device and the relay device executing the inquiry scan state. Next, the node device executes the page operation, and determines whether to establish a communication connection with the gateway device or the relay device to join the Bluetooth network according to the received extended inquiry response. In addition, after the node device with the relay function joins the Bluetooth network, the node device executes an inquiry scan state, so as to continue to expand the range of the Bluetooth network. The Bluetooth network establishing technology provided by the present disclosure determines whether to establish a communication connection through the operation of inquiry and page, so that a larger Bluetooth network can be established automatically.

The detailed technology and preferred embodiments implemented for the subject disclosure are described in the following paragraphs accompanying the appended drawings for people skilled in this field to well appreciate the features of the claimed disclosure.

DETAILED DESCRIPTION

In the following description, a Bluetooth network establishing system and method according to the present disclosure will be explained with reference to embodiments thereof. However, these embodiments are not intended to limit the present disclosure to any environment, applications, or implementations described in these embodiments. Therefore, the description of these embodiments is only for purpose of illustration rather than to limit the present disclosure. It shall be appreciated that, in the following embodiments and the attached drawings, elements unrelated to the present disclosure are omitted from depiction. In addition, dimensions of individual elements and dimensional relationships among individual elements in the attached drawings are provided only for illustration but not to limit the scope of the present disclosure.

Figure 1:
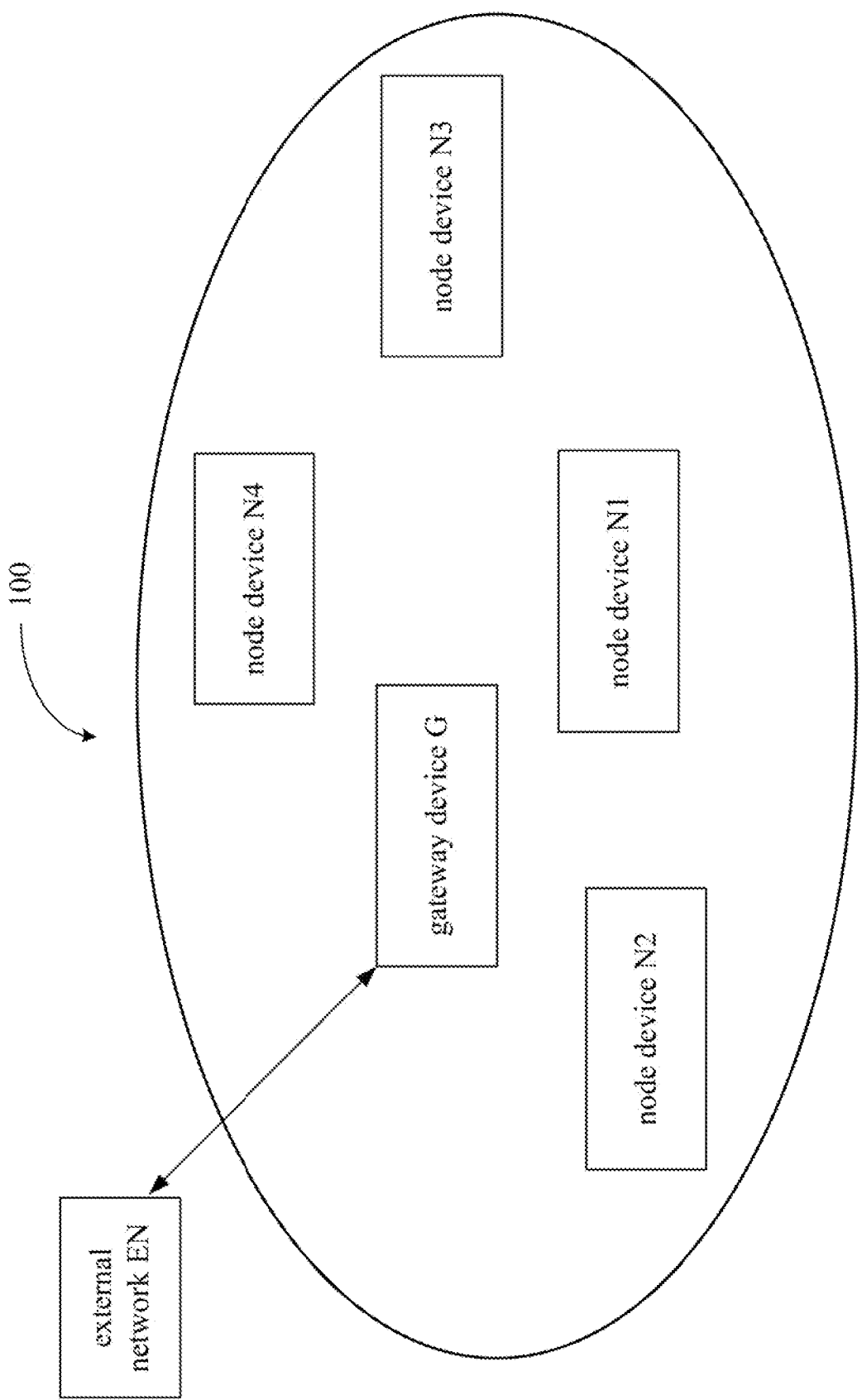
FIG. 1 is a schematic diagram depicting an applicable scenario of the Bluetooth network establishing system of the first embodiment.

First, the applicable scenario of the Bluetooth network establishing system in the present disclosure will be described, and its schematic diagram is depicted in FIG. 1. FIG. 1 illustrates a Bluetooth network establishing system 100 that has not yet formed a complete Bluetooth network. In the present example, the Bluetooth network establishing system 100 comprises a plurality of node devices (e.g., node device N1, node device N2, node device N3, node device N4) and a gateway device G.

It shall be appreciated that FIG. 1 is only used as an example. The present disclosure does not limit the number of node devices in the Bluetooth network establishing system 100, and the number of node devices should be determined according to the scale and actual needs of the Bluetooth network establishing system 100.

In the present embodiment, as shown in FIG. 1, the gateway device G can be connected to an external network EN through a wired connection or a wireless connection. It shall be appreciated that the gateway device G is the external data access channel of the Bluetooth network. All data communication with the external network in the Bluetooth network needs to pass through the gateway device G (e.g., a routing device).

In the present embodiment, each of the node devices can be further subdivided into two types of devices, namely, a node device with a relay function (i.e., a relay device) and a node device without a relay function (i.e., a node device).

It shall be appreciated that in addition to the attributes of the node device, the relay device itself can also be used for the forwarding operation of data in the Bluetooth network (i.e., forwarding the received data), so each of the relay devices can act as the relay station of the node device or other relay device to transmit data to the gateway device. Furthermore, the node device without the relay function will not undertake the relay operation in the Bluetooth network, and will only receive and send data related to itself.

It shall be appreciated that under the general Basic Rate/Enhanced Data Rate Bluetooth network technology, the devices can only establish a point-to-point pairing connection and only two devices can be communicated; however, the aforesaid technology cannot automatically form a larger Bluetooth network. In the present disclosure, when establishing a Bluetooth network, the gateway device G and the relay device may establish a communication connection between the devices through the inquiry scan state and the page scan state to form a larger Bluetooth network.

It shall be appreciated that, in the present disclosure, the node device that wants to join the Bluetooth network can search for the gateway device G or other relay devices that have joined the Bluetooth network by broadcasting an inquiry operation, and establish a communication connection with the gateway device G or other relay devices that have joined the Bluetooth network through the page operation. When the gateway device G and the relay device are in the inquiry scan state, an extended inquiry response will be sent to the node device that wants to join the Bluetooth network. In addition, when the gateway device G and the relay device are in the page scan state, they are allowed to be connected (i.e., the device to be joined is allowed to establish a communication connection therewith). The embodiments of the present disclosure will be described in detail below. Those with ordinary knowledge in the art should be able to understand the operation of inquiry and page based on the following contents, which will not be repeated here.

The first embodiment of the present disclosure will be described first, and please continue to refer to FIG. 1. In the first embodiment of the present disclosure, the gateway device G executes an inquiry scan state (e.g., the first inquiry scan state).

It shall be appreciated that the gateway device G may execute the inquiry scan state based on different mechanisms. For example, the gateway device G may execute the first inquiry scan state according to an inquiry scan parameter (e.g., an execution interval parameter and an execution window parameter). Specifically, the execution interval parameter may represent the time interval for executing the inquiry scan state once, and the execution window parameter may represent the time length of executing the inquiry scan state once.

In some embodiments, the gateway device G may continuously execute the inquiry scan state or once every predetermined time interval.

Next, in the present embodiment, a first node device among the node devices broadcast a first inquiry operation to inquire whether there is an extended inquiry response sent by the gateway device G or other relay devices in the nearby neighboring area.

It shall be appreciated that the first node device can broadcast the inquiry operation based on different inquiry mechanisms. For example, the first node device may broadcast the first inquiry operation according to an inquiry parameter (e.g., an execution interval parameter and an execution window parameter). In some embodiments, the first node device may continuously broadcast the first inquiry operation or once every predetermined time interval.

Next, the gateway device G in the first inquiry scan state responds to the first inquiry operation, the gateway device G sends a first extended inquiry response and executes a first page scan state, and the page scan state represents that the device (e.g., the gateway device G) has been allowed to be connected.

Subsequently, the first node device executes a first page operation, wherein the first page operation determines whether to establish a first communication connection with the gateway device G (i.e., the gateway device G is in the first page scan state) to join the Bluetooth network according to the first extended inquiry response.

In the present embodiment, if the first node device is a relay device, after the first node device joins the Bluetooth network, the first node device further executes an inquiry scan state (e.g., the second inquiry scan state) to allow other devices to connect to it.

It shall be appreciated that the first node device may also execute the inquiry scan state based on different mechanisms. For example, the first node device may execute the second inquiry scan state according to an inquiry scan parameter (e.g., an execution interval parameter and an execution window parameter). In some embodiments, the first node device continuously executes the inquiry scan state or once every predetermined time interval.

In some embodiments, a second node device among the node devices and the gateway device G further perform following operations: broadcasting, by the second node device, a second inquiry operation; sending, by the gateway device G in the first inquiry scan state, the first extended inquiry response and executing the first page scan state in response to the second inquiry operation; sending, by the first node device in the second inquiry scan state, a second extended inquiry response and executing a second page scan state in response to the second inquiry operation; and executing, by the second node device, a second page operation, wherein the second page operation determines whether to establish a second communication connection with the gateway device G or the first node device to join the Bluetooth network according to the first extended inquiry response and the second extended inquiry response.

In some embodiments, since the distance between the node device and the gateway device G may exceed the scanning range of the node device, the node device can only find other relay devices in the scanning range. In such a case, the node device can establish a communication connection with the relay device connected to the gateway device G. For example, the Bluetooth network currently comprises the gateway device G, the first node device, and a third node device among the node devices (i.e., a relay device that has established a communication connection). In some embodiments, the third node device executes a third inquiry scan state, and a fourth node device among the node devices further performs following operations: broadcasting, by the fourth node device, a third inquiry operation; sending, by the first node device in the second inquiry scan state, the second extended inquiry response and executing the second page scan state in response to the third inquiry operation; sending, by the third node device in a third inquiry scan state, a third extended inquiry response and executing a third page scan state in response to the third inquiry operation; and determining, by the fourth node device, whether to establish a third communication connection with the first node device or the third node device to join the Bluetooth network according to the second extended inquiry response and the third extended inquiry response.

In some embodiments, the extended inquiry responses of the present disclosure (e.g., the first extended inquiry response and the second extended inquiry response) comprise at least one of a network number, a device attribute flag, and a path consumption or a combination thereof.

It shall be appreciated that the Bluetooth network can distinguish different local area networks (LANs) through different network numbers. For example, different LANs can be set with different network numbers to facilitate the control and identification of the device. In some embodiments, the Bluetooth network may not use the network number to distinguish, but only use the default network number (e.g., 0 or other reserved numbers).

It shall be appreciated that the purpose of the device attribute flag is to enable the packet receiver to determine whether the packet is a packet of the same Bluetooth network, so that the device can further perform subsequent processing after receiving. In addition, the device attribute flag can determine the attribute of the device sending the packet (e.g., the gateway device, the relay device, or the node device). In some embodiments, the device attribute flag can be implemented through information in different fields. For example, the device can be determined through fields such as Manufacturer Specific Data, Service Universally Unique Identifier, Service Data, and the like.

In some embodiments, the path consumption is related to one or a combination of a number of hops, a Bluetooth connection parameter, and a plurality of Bluetooth transmission quality influencing factors for transmitting the packet to the gateway device G. For example, when the device is directly connected to the gateway device G, the number of hops is 0. When the device is connected to the gateway device G through a relay device, the number of hops is 1. For another example, the Bluetooth connection parameter may be, for example, a sniff interval in Basic Rate/Enhanced Data Rate Bluetooth technology. For another example, a plurality of Bluetooth transmission quality influencing factors can be the retransmission probability of data packets in the air, modulation mode, working mode (BR/EDR 2M/BREDR 3M), the available bandwidth of the device node, the congestion degree of the device node, etc.

In some embodiments, the node device can determine whether to join the Bluetooth network by comparing the network number. Specifically, the first node device compares whether the network number comprised in the first extended inquiry response is the same as the network number corresponding to the first node device. When the network number comprised in the first extended inquiry response is the same as the network number corresponding to the first node device, the first node device establishes the first communication connection with the gateway device G to join the Bluetooth network.

In some embodiments, for the purpose of load balancing (e.g., transferring data though a plurality of paths simultaneously) or backup paths (e.g., when a path goes down, another backup path can still be used), the node device can also be connected to a plurality of devices with the same network number at the same time. Specifically, the second node device determines whether to establish the second communication connection with the gateway device G or the first node device to join the Bluetooth network by comparing whether the network number comprised in the first extended inquiry response and the second extended inquiry response is the same as the network number corresponding to the second node device. The second node device establishes the second communication connection with the gateway device when the network number comprised in the first extended inquiry response is the same as the network number corresponding to the second node device. The second node device establishes the second communication connection with the first node device when the network number comprised in the second extended inquiry response is the same as the network number corresponding to the second node device.

In some embodiments, the node device may determine whether to join the Bluetooth network by calculating the path consumption of each device sending packets (e.g., the relay device and the gateway device G). Specifically, the second node device determines to establish the second communication connection with the gateway device G or the first node device according to the path consumption comprised in the first extended inquiry response and the second extended inquiry response. The path consumption is related to one or a combination of a number of hops, a Bluetooth connection parameter, and a plurality of Bluetooth transmission quality influencing factors for transmitting a packet to the gateway device G.

In some embodiments, the node device may establish a communication connection with a device with lower path consumption preferentially.

In some embodiments, the gateway device G and the relay device may further set an inquiry scan parameter of the inquiry scan status and a page scan parameter of the page scan status. Specifically, the gateway device G and the relay device further perform following operations: executing the inquiry scan state (e.g., the first inquiry scan state or the second inquiry scan state) according to an inquiry scan parameter; and executing the page scan state (e.g., the first page scan state or the second page scan state) according to a page scan parameter.

In some embodiments, the relay device and the node device may further set an inquiry parameter corresponding to the inquiry operation and a page parameter corresponding to the page operation. Specifically, the relay device and the node device further perform following operations: broadcasting the inquiry operation (e.g., the first inquiry operation or the second inquiry operation) according to an inquiry parameter; and executing the page operation (e.g., the first page operation or the second page operation) according to a page parameter.

For example, the aforementioned parameters may comprise an execution interval parameter and an execution window parameter, and the execution interval parameter may represent the time interval for executing the inquiry scan state once, and the execution window parameter may represent the time length of executing the inquiry scan state once.

Figure 2:
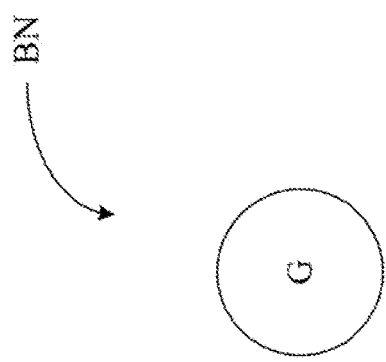
FIG. 2 is a schematic diagram depicting a Bluetooth network.

For ease of understanding, an actual process of establishing a Bluetooth network is used as an example to illustrate, please refer to FIG. 2 to FIG. 8 in sequence. In the present example, as shown in FIG. 2, the gateway device G starts to execute an inquiry scan state. Currently, the Bluetooth network BN only comprises the gateway device G.

For ease of understanding, the following node devices with a relay function will be directly referred to as relay devices. It shall be appreciated that a node device with a relay function is still a node device.

Figure 3:
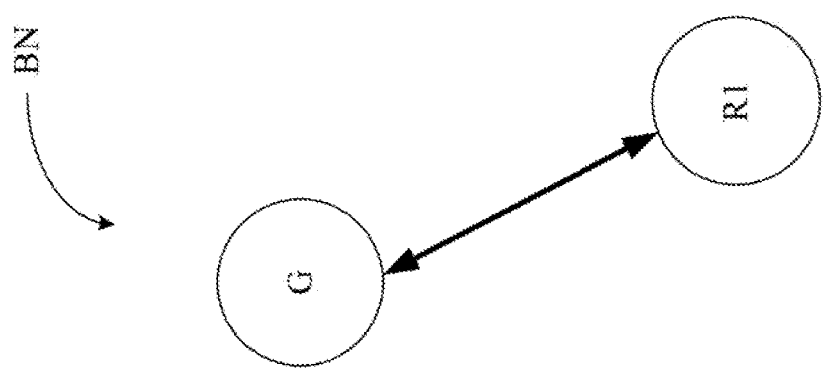
FIG. 3 is a schematic diagram depicting a Bluetooth network.

Next, in the present example, the relay device R1 starts to broadcast an inquiry operation to inquire a nearby area (e.g., a range area centered on the relay device R1) whether there is an extended inquiry response sent by the gateway device G or other relay devices. Then, as shown in FIG. 3, since the relay device R1 receives the extended inquiry response sent by the gateway device G, the relay device R1 establishes a communication connection with the gateway device G and joins the Bluetooth network BN. In addition, after the relay device R1 is successfully connected to the gateway device G, the relay device R1 may notify (i.e., executing an inquiry scan state) other devices that it is already a relay device.

Figure 4:
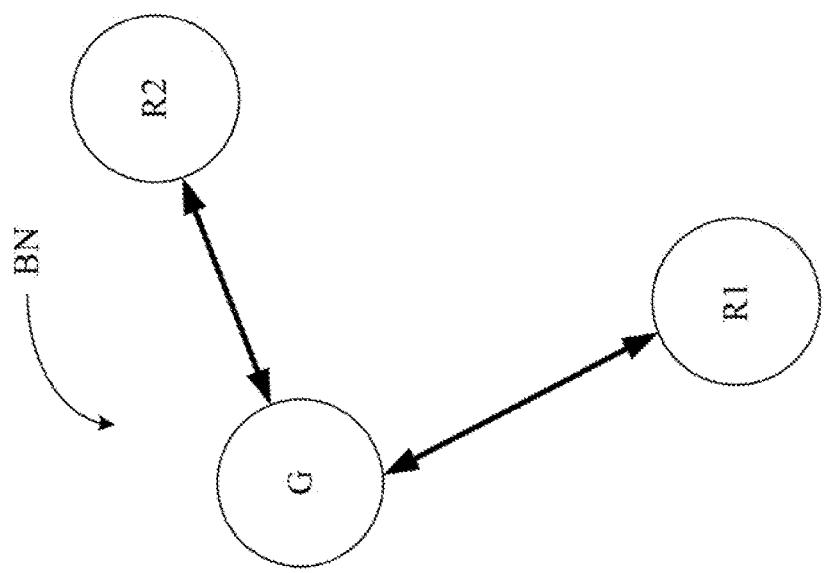
FIG. 4 is a schematic diagram depicting a Bluetooth network.

Next, in the present example, the relay device R2 starts to broadcast an inquiry operation to inquire whether there is an extended inquiry response sent by the gateway device G or other relay devices in the nearby area. In the present example, the relay device R2 receives the extended inquiry responses sent by the gateway device G and the relay device R1 respectively. Then, as shown in FIG. 4, the relay device R2 chooses to establish a communication connection with the gateway device G (e.g., the relay device R2 can make a determination based on an algorithm, for example, based on the network number, path consumption, load balancing, backup paths, etc.), and join to the Bluetooth network BN. In addition, after the relay device R2 is successfully connected to the gateway device G, the relay device R2 may notify (i.e., executing an inquiry scan state) other devices that it is already a relay device.

In some examples, the relay device R2 can also establish communication connections with both the gateway device G and the relay device R1.

Figure 5:
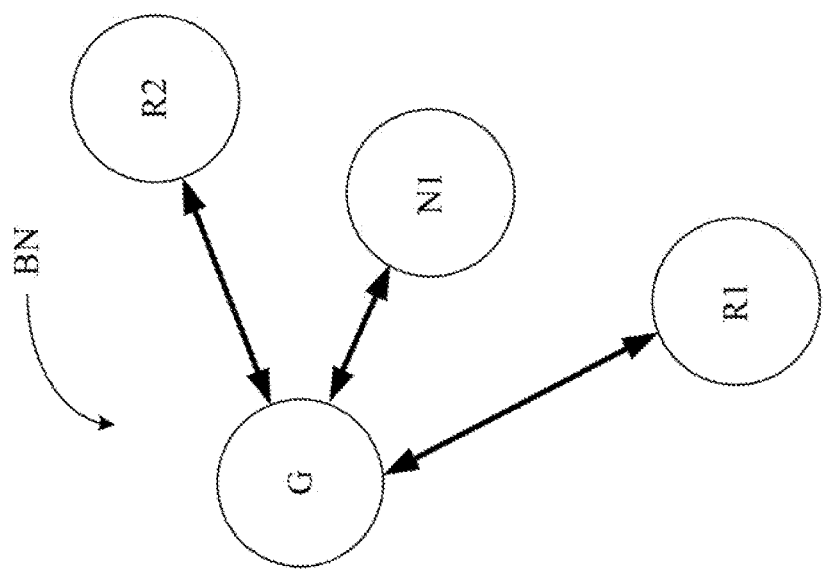
FIG. 5 is a schematic diagram depicting a Bluetooth network.

Next, in the present example, the node device N1 starts to broadcast an inquiry operation to inquire a nearby area whether there is an extended inquiry response sent by the gateway device G or other relay devices. In the present example, the node device N1 receives the extended inquiry responses sent by the gateway device G, the relay device R1, and the relay device R2 respectively. Then, as shown in FIG. 5, the node device N1 chooses to establish a communication connection with the gateway device G (e.g., the node device N1 can make a determination based on an algorithm, for example, based on the network number, path consumption, load balancing, backup path, etc.), and join to the Bluetooth network BN. In addition, since the node device N1 is only a node device and does not have a relay function, the node device N1 will not execute an inquiry scan state.

In some examples, the node device N1 can also establish a communication connection with any one, both or all of the gateway device G, the relay device R1, and the relay device R2.

Figure 6:
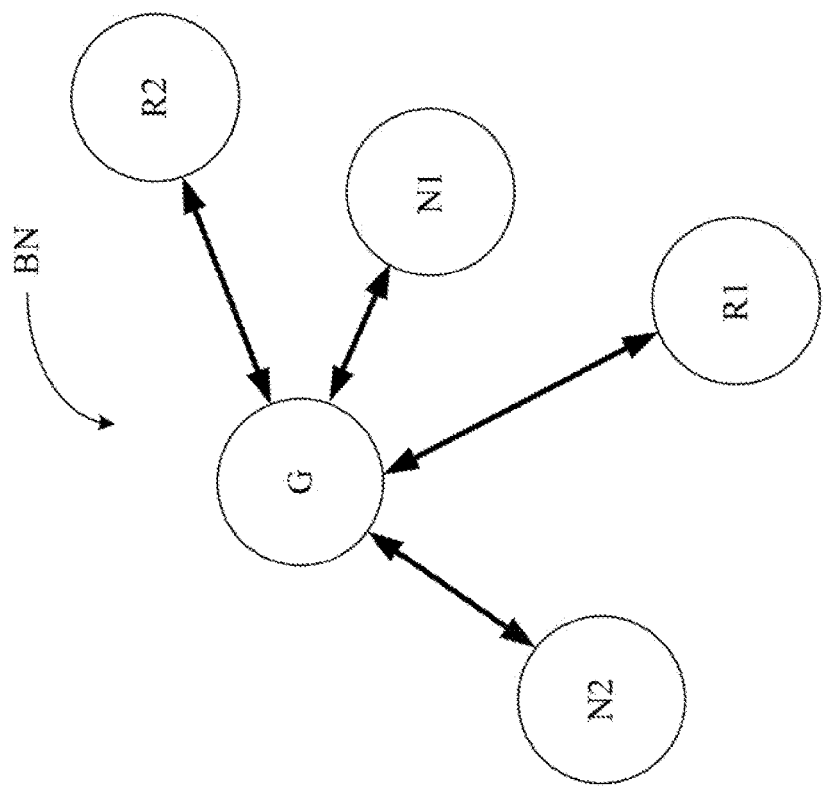
FIG. 6 is a schematic diagram depicting a Bluetooth network.

Next, in the present example, the node device N2 starts to broadcast inquiry operation to inquire whether there is an extended inquiry response sent by the gateway device G or other relay devices in the nearby area. In the present example, due to the distance relationship (i.e., the relay device R2 is too far away to be in the inquiry range), the node device N2 only receives the extended inquiry responses sent by the gateway device G and the relay device R1. Then, as shown in FIG. 6, the node device N1 chooses to establish a communication connection with the gateway device G (e.g., the node device N2 can make a determination based on an algorithm, for example: based on the network number, path consumption, load balancing, backup path, etc.), and join to the Bluetooth network BN. In addition, since the node device N2 is only a node device and does not have a relay function, the node device N2 will not execute an inquiry scan state.

Figure 7:
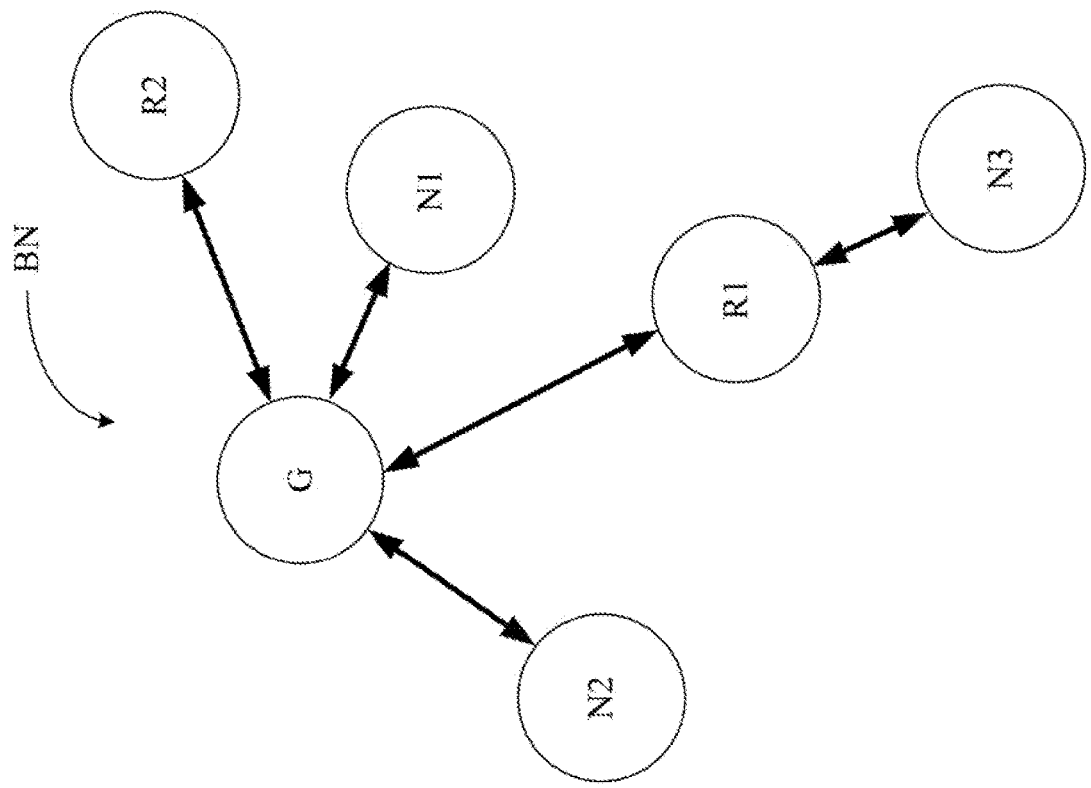
FIG. 7 is a schematic diagram depicting a Bluetooth network.

Next, in the present example, the node device N3 starts to broadcast an inquiry operation to inquire whether there is an extended inquiry response sent by the gateway device G or other relay devices. In the present example, due to the distance relationship (i.e., the gateway device G and the relay device R2 are too far away to be in the inquiry range), the node device N3 only receives the extended inquiry responses sent by the relay device R1. Then, as shown in FIG. 7, the node device N3 chooses to establish a communication connection with the relay device R1 and joins to the Bluetooth network BN. In addition, since the node device N3 is only a node device and does not have a relay function, the node device N3 will not execute an inquiry scan state.

Figure 8:
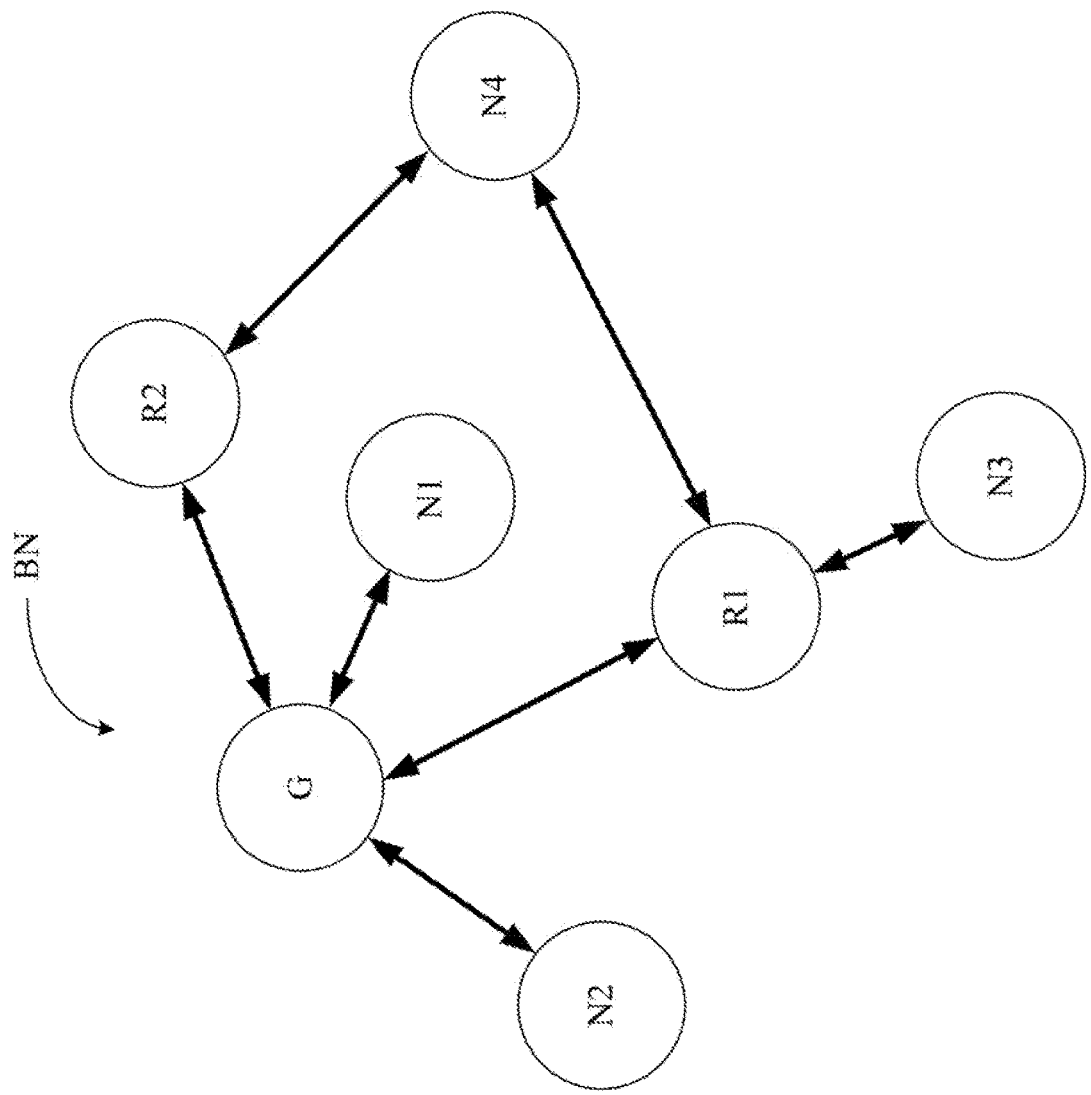
FIG. 8 is a schematic diagram depicting a Bluetooth network.

Next, in the present example, the node device N4 starts to broadcast an inquiry operation to inquire whether there is an extended inquiry response sent by the gateway device G or other relay devices in the nearby area. In the present example, due to the distance relationship (i.e., the gateway device G is too far away to be in the inquiry range), the node device N4 only receives the extended inquiry responses sent by the relay device R1 and the relay device R2. Then, as shown in FIG. 8, the node device N4 chooses to establish the communication connections with both the relay device R1 and the relay device R2, and joins to the Bluetooth network BN. In addition, since the node device N4 is only a node device and does not have a relay function, the node device N4 will not execute an inquiry scan state.

In the present example, as shown in FIG. 8, the Bluetooth network BN has been established. The Bluetooth network BN comprises a gateway device G, the relay device R1, the relay device R2, the node devices N1, N2, N3, N4 and their respective communication connection relationships.

According to the above descriptions, the Bluetooth network establishing system 100 provided by the present disclosure inquires whether there is an extended inquiry response sent by a gateway device or a relay device in the nearby area through the node device broadcasting the inquiry operation and the gateway device and the relay device executing the inquiry scan state. Next, the node device executes the page operation, and determines whether to establish a communication connection with the gateway device or the relay device to join the Bluetooth network according to the received extended inquiry response. In addition, after the node device with the relay function joins the Bluetooth network, the node device executes an inquiry scan state, so as to continue to expand the range of the Bluetooth network. The Bluetooth network establishing system 100 provided by the present disclosure determines whether to establish a communication connection through the operation of inquiry and page, so that a larger Bluetooth network can be established automatically.

Figure 9:
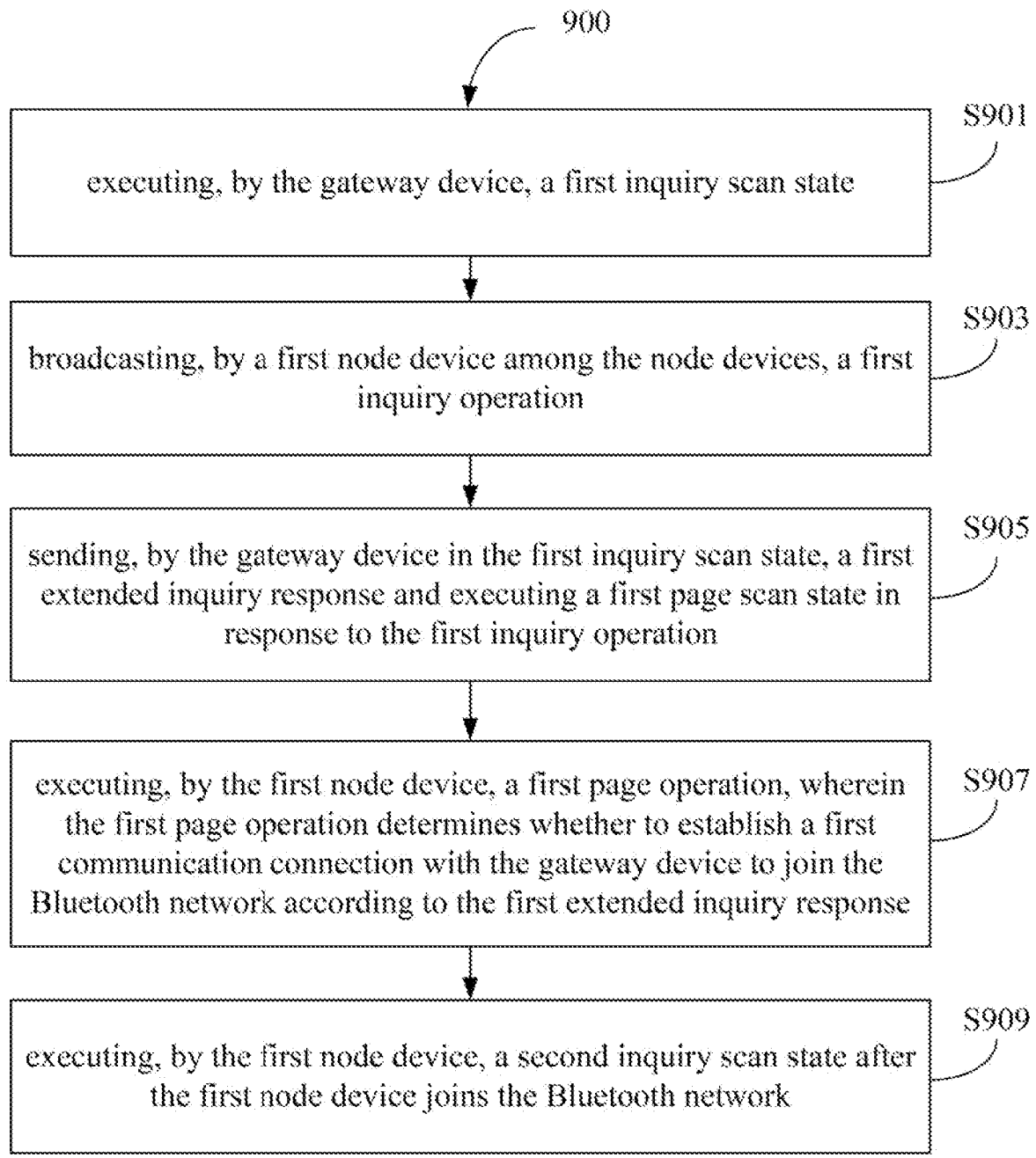
FIG. 9 is a partial flowchart depicting the Bluetooth network establishing method of the second embodiment.

A second embodiment of the present disclosure is a Bluetooth network establishing method and a flowchart thereof is depicted in FIG. 9. The Bluetooth network establishing method 900 is adapted for a Bluetooth network establishing system (e.g., the Bluetooth network establishing system 100 of the first embodiment). The Bluetooth network establishing system comprises a plurality of node devices and a gateway device (e.g., the node devices N1, N2, N3, N4 and the gateway device G of the first embodiment). The gateway device is configured to connect a Bluetooth network to an external network. The Bluetooth network establishing method 900 establishes the Bluetooth network through steps S901 to S909.

In the step S901, the gateway device executes a first inquiry scan state. Next, in the step S903, a first node device among the node devices broadcasts a first inquiry operation.

Next, in the step S905, the gateway device in the first inquiry scan state sends a first extended inquiry response and executes a first page scan state in response to the first inquiry operation. Next, in the step S907, the first node device executes a first page operation, wherein the first page operation determines whether to establish a first communication connection with the gateway device to join the Bluetooth network according to the first extended inquiry response. Finally, in the step S909, after the first node joins the Bluetooth network, the first node device executes a second inquiry scan state.

In some embodiments, the Bluetooth network establishing method 900 further comprises following steps: broadcasting, by a second node device among the node devices, a second inquiry operation; sending, by the gateway device in the first inquiry scan state, the first extended inquiry response and executing the first page scan state in response to the second inquiry operation; sending, by the first node device in the second inquiry scan state, a second extended inquiry response and executing a second page scan state in response to the second inquiry operation; and executing, by the second node device, a second page operation, wherein the second page operation determines whether to establish a second communication connection with the gateway device or the first node device to join the Bluetooth network according to the first extended inquiry response and the second extended inquiry response.

In some embodiments, wherein the Bluetooth network comprises the gateway device, the first node device, and a third node device among the node devices, and the Bluetooth network establishing method 900 further comprises following steps: broadcasting, by a fourth node device among the node devices, a third inquiry operation; sending, by the first node device in the second inquiry scan state, the second extended inquiry response and executing the second page scan state in response to the third inquiry operation; sending, by the third node device in a third inquiry scan state, a third extended inquiry response and executing a third page scan state in response to the third inquiry operation; and determining, by the fourth node device, whether to establish a third communication connection with the first node device or the third node device to join the Bluetooth network according to the second extended inquiry response and the third extended inquiry response.

In some embodiments, the first extended inquiry response and the second extended inquiry response comprise at least one of a network number, a device attribute flag, and a path consumption or a combination thereof.

In some embodiments, the Bluetooth network establishing method 900 further comprises following steps: comparing, by the first node device, whether the network number comprised in the first extended inquiry response is the same as the network number corresponding to the first node device; and establishing, by the first node device, the first communication connection with the gateway device to join the Bluetooth network when the network number comprised in the first extended inquiry response is the same as the network number corresponding to the first node device.

In some embodiments, the Bluetooth network establishing method 900 further comprises following steps: determining, by the second node device, whether to establish the second communication connection with the gateway device or the first node device to join the Bluetooth network by comparing whether the network number comprised in the first extended inquiry response and the second extended inquiry response is the same as the network number corresponding to the second node device; wherein the second node device establishes the second communication connection with the gateway device when the network number comprised in the first extended inquiry response is the same as the network number corresponding to the second node device; wherein the second node device establishes the second communication connection with the first node device when the network number comprised in the second extended inquiry response is the same as the network number corresponding to the second node device.

In some embodiments, the Bluetooth network establishing method 900 further comprises following steps: determining, by the second node device, to establish the second communication connection with the gateway device or the first node device according to the path consumption comprised in the first extended inquiry response and the second extended inquiry response; wherein the path consumption is related to one or a combination of a number of hops, a Bluetooth connection parameter, and a plurality of Bluetooth transmission quality influencing factors for transmitting a packet to the gateway device.

In some embodiments, the Bluetooth network establishing method 900 further comprises following steps: executing, by the gateway device, the first inquiry scan state according to an inquiry scan parameter; and executing, by the gateway device, the first page scan state according to a page scan parameter.

In some embodiments, the Bluetooth network establishing method 900 further comprises following steps: broadcasting, by the first node device, the first inquiry operation according to an inquiry parameter; and executing, by the first node device, the first page operation according to a page parameter.

In some embodiments, the Bluetooth network establishing method 900 further comprises following steps: executing, by the first node device, the second inquiry scan state according to an inquiry scan parameter; and executing, by the first node device, the second page scan state according to a page scan parameter.

In addition to the aforesaid steps, the second embodiment can also execute all the operations and steps of the Bluetooth network establishing system 100 set forth in the first embodiment, have the same functions, and deliver the same technical effects as the first embodiment. How the second embodiment executes these operations and steps, has the same functions, and delivers the same technical effects will be readily appreciated by those of ordinary skill in the art based on the explanation of the first embodiment. Therefore, the details will not be repeated herein.

It shall be appreciated that in the specification and the claims of the present disclosure, some words (e.g., the inquiry scan state, the node device, the inquiry operation, the extended inquiry response, the page scan state, the page operation, and the communication connection, etc.) are preceded by terms such as "first", "second", "third", and "fourth", and these terms of "first", "second", "third", and "fourth" are only used to distinguish these different words. For example, the "third" and "fourth" of the third node device and the fourth node device are only used to indicate the node device used in different operations.

According to the above descriptions, the Bluetooth network establishing technology (at least including the system and method) provided by the present disclosure inquires whether there is an extended inquiry response sent by a gateway device or a relay device in the nearby area through the node device broadcasting the inquiry operation and the gateway device and the relay device executing the inquiry scan state. Next, the node device executes the page operation, and determines whether to establish a communication connection with the gateway device or the relay device to join the Bluetooth network according to the received extended inquiry response. In addition, after the node device with the relay function joins the Bluetooth network, the node device executes an inquiry scan state, so as to continue to expand the range of the Bluetooth network. The Bluetooth network establishing technology provided by the present disclosure determines whether to establish a communication connection through the operation of inquiry and page, so that a larger Bluetooth network can be established automatically.

The above disclosure is related to the detailed technical contents and inventive features thereof. People skilled in this field may proceed with a variety of modifications and replacements based on the disclosures and suggestions of the disclosure as described without departing from the characteristics thereof. Nevertheless, although such modifications and replacements are not fully disclosed in the above descriptions, they have substantially been covered in the following claims as appended.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A Bluetooth network establishing system, comprising:
a plurality of node devices; and
a gateway device, being configured to connect a Bluetooth network to an external network;
wherein, a first node device among the node devices and the gateway device perform following operations:
broadcasting, by the first node device, a first inquiry operation;
sending, by the gateway device in a first inquiry scan state, a first extended inquiry response and executing a first page scan state in response to the first inquiry operation;
executing, by the first node device, a first page operation, wherein the first page operation determines whether to establish a first communication connection with the gateway device to join the Bluetooth network according to the first extended inquiry response; and
executing, by the first node device, a second inquiry scan state after the first node device joins the Bluetooth network.

2. The Bluetooth network establishing system of claim 1, wherein a second node device among the node devices and the gateway device perform following operations:
broadcasting, by the second node device, a second inquiry operation;
sending, by the gateway device in the first inquiry scan state, the first extended inquiry response and executing the first page scan state in response to the second inquiry operation;
sending, by the first node device in the second inquiry scan state, a second extended inquiry response and executing a second page scan state in response to the second inquiry operation; and
executing, by the second node device, a second page operation, wherein the second page operation determines whether to establish a second communication connection with the gateway device or the first node device to join the Bluetooth network according to the first extended inquiry response and the second extended inquiry response.

3. The Bluetooth network establishing system of claim 2, wherein the Bluetooth network comprises the gateway device, the first node device, and a third node device among the node devices, and the first node device, the third node device, and a fourth node device among the node devices perform following operations:
broadcasting, by the fourth node device, a third inquiry operation;
sending, by the first node device in the second inquiry scan state, the second extended inquiry response and executing the second page scan state in response to the third inquiry operation;
sending, by the third node device in a third inquiry scan state, a third extended inquiry response and executing a third page scan state in response to the third inquiry operation; and
determining, by the fourth node device, whether to establish a third communication connection with the first node device or the third node device to join the Bluetooth network according to the second extended inquiry response and the third extended inquiry response.

4. The Bluetooth network establishing system of claim 2, wherein the first extended inquiry response and the second extended inquiry response comprise at least one of a network number, a device attribute flag, and a path consumption or a combination thereof.

5. The Bluetooth network establishing system of claim 4, wherein the first node device further performs following operations:
comparing whether the network number comprised in the first extended inquiry response is the same as the network number corresponding to the first node device; and establishing the first communication connection with the gateway device to join the Bluetooth network when the network number comprised in the first extended inquiry response is the same as the network number corresponding to the first node device.

6. The Bluetooth network establishing system of claim 4, wherein the second node device further performs following operations:
   determining whether to establish the second communication connection with the gateway device or the first node device to join the Bluetooth network by comparing whether the network number comprised in the first extended inquiry response and the second extended inquiry response is the same as the network number corresponding to the second node device;
   wherein the second node device establishes the second communication connection with the gateway device when the network number comprised in the first extended inquiry response is the same as the network number corresponding to the second node device;
   wherein the second node device establishes the second communication connection with the first node device when the network number comprised in the second extended inquiry response is the same as the network number corresponding to the second node device.

7. The Bluetooth network establishing system of claim 4, wherein the second node device further performs following operations:
   determining to establish the second communication connection with the gateway device or the first node device according to the path consumption comprised in the first extended inquiry response and the second extended inquiry response;
   wherein the path consumption is related to one or a combination of a number of hops, a Bluetooth connection parameter, and a plurality of Bluetooth transmission quality influencing factors for transmitting a packet to the gateway device.

8. The Bluetooth network establishing system of claim 1, wherein the gateway device further performs following operations:
   executing the first inquiry scan state according to an inquiry scan parameter; and
   executing the first page scan state according to a page scan parameter.

9. The Bluetooth network establishing system of claim 1, wherein the first node device further performs following operations:
   broadcasting the first inquiry operation according to an inquiry parameter; and
   executing the first page operation according to a page parameter.

10. The Bluetooth network establishing system of claim 2, wherein the first node device further performs following operations:
    executing the second inquiry scan state according to an inquiry scan parameter; and
    executing the second page scan state according to a page scan parameter.

11. A Bluetooth network establishing method, being adapted for use in a Bluetooth network establishing system, wherein the Bluetooth network establishing system comprises a plurality of node devices and a gateway device, the gateway device is configured to connect a Bluetooth network to an external network, and the Bluetooth network establishing method comprises following steps:
    executing, by the gateway device, a first inquiry scan state;
    broadcasting, by a first node device among the node devices, a first inquiry operation;
    sending, by the gateway device in the first inquiry scan state, a first extended inquiry response and executing a first page scan state in response to the first inquiry operation;
    executing, by the first node device, a first page operation, wherein the first page operation determines whether to establish a first communication connection with the gateway device to join the Bluetooth network according to the first extended inquiry response; and
    executing, by the first node device, a second inquiry scan state after the first node device joins the Bluetooth network.

12. The Bluetooth network establishing method of claim 11, wherein the Bluetooth network establishing method further comprises following steps:
    broadcasting, by a second node device among the node devices, a second inquiry operation;
    sending, by the gateway device in the first inquiry scan state, the first extended inquiry response and executing the first page scan state in response to the second inquiry operation;
    sending, by the first node device in the second inquiry scan state, a second extended inquiry response and executing a second page scan state in response to the second inquiry operation; and
    executing, by the second node device, a second page operation, wherein the second page operation determines whether to establish a second communication connection with the gateway device or the first node device to join the Bluetooth network according to the first extended inquiry response and the second extended inquiry response.

13. The Bluetooth network establishing method of claim 12, wherein the Bluetooth network comprises the gateway device, the first node device, and a third node device among the node devices, and the Bluetooth network establishing method further comprises following steps:
    broadcasting, by a fourth node device among the node devices, a third inquiry operation;
    sending, by the first node device in the second inquiry scan state, the second extended inquiry response and executing the second page scan state in response to the third inquiry operation;
    sending, by the third node device in a third inquiry scan state, a third extended inquiry response and executing a third page scan state in response to the third inquiry operation; and
    determining, by the fourth node device, whether to establish a third communication connection with the first node device or the third node device to join the Bluetooth network according to the second extended inquiry response and the third extended inquiry response.

14. The Bluetooth network establishing method of claim 12, wherein the first extended inquiry response and the second extended inquiry response comprise at least one of a network number, a device attribute flag, and a path consumption or a combination thereof.

15. The Bluetooth network establishing method of claim 14, wherein the Bluetooth network establishing method further comprises following steps:
    comparing, by the first node device, whether the network number comprised in the first extended inquiry response is the same as the network number corresponding to the first node device; and establishing, by the first node device, the first communication connection with the gateway device to join the Bluetooth network when the network number comprised in the first extended inquiry response is the same as the network number corresponding to the first node device.

16. The Bluetooth network establishing method of claim 14, wherein the Bluetooth network establishing method further comprises following steps:

determining, by the second node device, whether to establish the second communication connection with the gateway device or the first node device to join the Bluetooth network by comparing whether the network number comprised in the first extended inquiry response and the second extended inquiry response is the same as the network number corresponding to the second node device;

wherein the second node device establishes the second communication connection with the gateway device when the network number comprised in the first extended inquiry response is the same as the network number corresponding to the second node device;

wherein the second node device establishes the second communication connection with the first node device when the network number comprised in the second extended inquiry response is the same as the network number corresponding to the second node device.

17. The Bluetooth network establishing method of claim 14, wherein the Bluetooth network establishing method further comprises following steps:

determining, by the second node device, to establish the second communication connection with the gateway device or the first node device according to the path consumption comprised in the first extended inquiry response and the second extended inquiry response;

wherein the path consumption is related to one or a combination of a number of hops, a Bluetooth connection parameter, and a plurality of Bluetooth transmission quality influencing factors for transmitting a packet to the gateway device.

18. The Bluetooth network establishing method of claim 11, wherein the Bluetooth network establishing method further comprises following steps:

executing, by the gateway device, the first inquiry scan state according to an inquiry scan parameter; and executing, by the gateway device, the first page scan state according to a page scan parameter.

19. The Bluetooth network establishing method of claim 11, wherein the Bluetooth network establishing method further comprises following steps:

broadcasting, by the first node device, the first inquiry operation according to an inquiry parameter; and executing, by the first node device, the first page operation according to a page parameter.

20. The Bluetooth network establishing method of claim 12, wherein the Bluetooth network establishing method further comprises following steps:

executing, by the first node device, the second inquiry scan state according to an inquiry scan parameter; and executing, by the first node device, the second page scan state according to a page scan parameter.

\* \* \* \* \*